United States Patent [19]

Mulot

[11] 4,160,395
[45] Jul. 10, 1979

[54] THREAD-CUTTING MACHINE
[75] Inventor: Georges C. Mulot, Carrieres sur Seine, France
[73] Assignee: Cri-Dan, Paris, France
[21] Appl. No.: 839,561
[22] Filed: Oct. 5, 1977
[30] Foreign Application Priority Data
Oct. 26, 1976 [FR] France .................. 76 32233
[51] Int. Cl.² .................. B23B 21/00; B23G 3/08
[52] U.S. Cl. ........................................ 82/5
[58] Field of Search ............................... 82/5
[56] References Cited
U.S. PATENT DOCUMENTS

| 3,420,126 | 1/1969 | Renoux | 82/5 |
| 3,472,104 | 10/1969 | Berly | 82/5 |
| 4,036,086 | 7/1977 | Thumm et al. | 82/5 |

Primary Examiner—Leonidas Vlachos
Attorney, Agent, or Firm—Lane, Aitken & Ziems

[57] ABSTRACT

A thread-cutting machine, of the type which includes a longitudinal carriage whose reciprocal movements are obtained from a first cam, called pitch cam, a transverse carriage carrying a tool and whose reciprocal movements are obtained from a second cam, called forward and backward movement cam, and means for ensuring the progression of the tool towards the work piece during successive threading cuts is characterized in that the tool progression means are formed by a numerical control motor capable of ensuring the transverse movement of the forward and backward movement cam and a third cam is operatively connected between the pitch cam and forward and backward movement cam for synchronizing the reciprocal movement of the forward and backward movement cam with the pitch cam.

2 Claims, 1 Drawing Figure

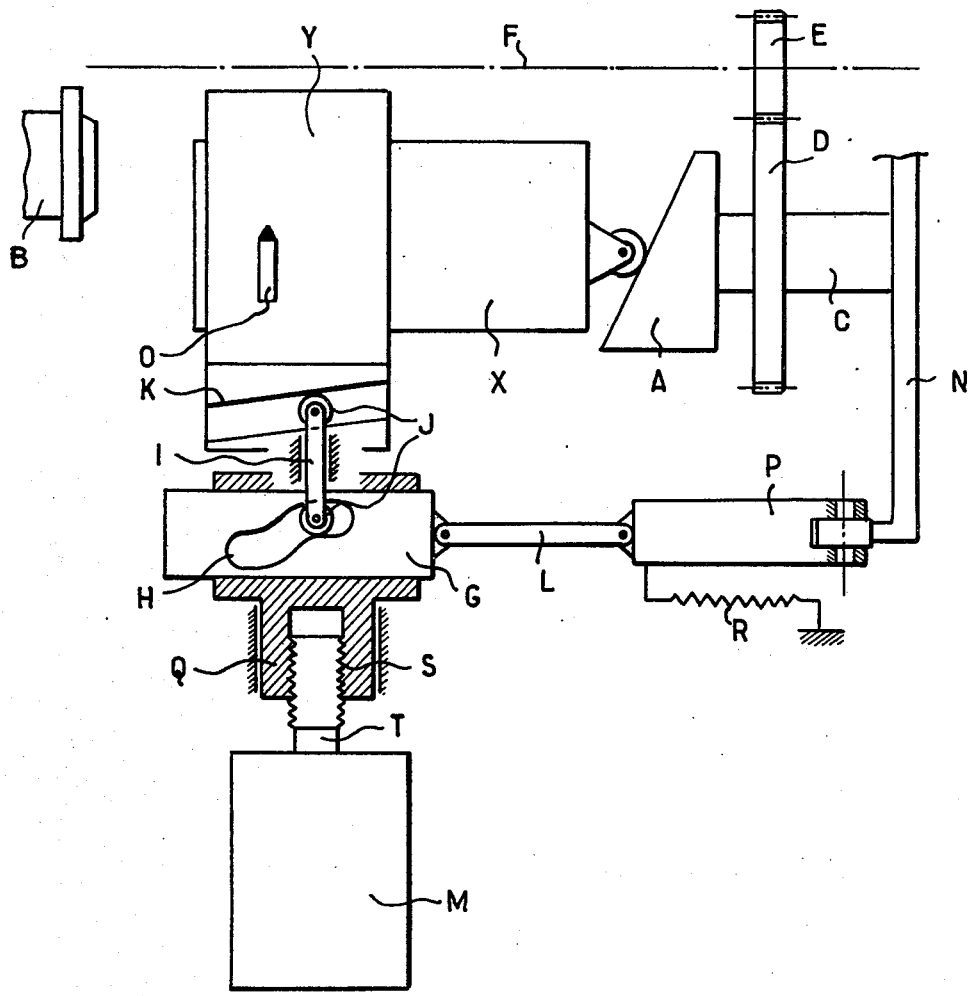

THREAD-CUTTING MACHINE

The present invention relates to a thread-cutting machine of the type comprising a longitudinal carriage whose reciprocal movements are obtained from a first cam, called pitch cam, a transverse carriage carrying a tool and whose reciprocal movements are obtained from a second cam, called forward and backward movement cam, and means for ensuring the progression of the tool towards the workpiece during the successive threading cuts.

Such machines, so-called cam-driven, are at present well-known and have been used for a long time to cut threads in extremely different pieces. They enable in particular, owing to the combined action of the pitch cam and the forward and backward movement cam, very rapid rectangular threading cycles or derivatives to be obtained, the synchronisation between the movements of both carriages being always the same and the speeds being limited only by the stresses compatible with the pneumatic or spring return elements.

In these cam machines, the progression of the tool, i.e., its penetration into the work-piece, following a definite law, during successive threading cuts, is generally obtained, either by a stepped ramp or by eccentrics ensuring the laws of movement, or else by slanting discs providing the same characteristics of movement as the eccentrics. The mechanical assembly necessary to obtain the desired forward movements is however relatively complex. Moreover, the laws of progression are not commonplace and it is sometimes difficult to obtain graduations of movement which are strictly in accordance with the desired theoretical laws.

Moreover, so-called numerical control machines are known with which it is very easy to obtain any axial penetrations since it is sufficient to programme them. Such machines however do not permit backward movements of the transverse carriage and of the longitudinal carriage to be obtained as rapid as in cam machines, so that their productivity remains very inferior. They are moreover complex and costly.

The present invention has then as its principal aim to remedy these disadvantages and to do this it has as its object a thread-cutting machine of the cam type, which is essentially characterised in that the means for moving the tool forward are formed by a numerical control motor capable of ensuring the transverse movement of the forward and backward movement cam.

The machine of the invention thus presents simultaneously the advantage of rectangular elementary cycles or derivatives thereof obtained in a simple manner by means of cams, with the possibility of achieving pitch progressions of absolutely any kind owing to the numerical control of the movements.

In a particular embodiment of the invention, the forward and backward movement cam is of the reciprocal translational movement type and comprises a ramp ensuring the reciprocal movement of the transverse carriage, said cam being slidably mounted in a nut shaped support provided movable in the transverse direction and engaging by a screw thread with the output shaft of the numerical control motor.

It will be readily understood that owing to this extremely simple arrangement, any transverse movement of the cam can be achieved and thus any desired progression of pitch can be obtained, providing that the numerical control motor is correspondingly programmed.

One embodiment of the invention will be described hereafter by way of example, with reference to the accompanying drawing in which the single FIGURE represents, very schematically, a thread-cutting machine in accordance with the present invention.

This machine comprises first of all, in a quite conventional way, a longitudinal carriage X on which is slidably mounted a transverse carriage Y carrying a tool O.

The longitudinal movements of the assembly formed by carriages X and Y are provided by the rotation of a pitch cam A fixed on a shaft C. Of course the number of revolutions of shaft C is in direct and complete relation with that of spindle B of the machine supporting the work-piece to be machined. This relation is obtained by means of fixed and removable pinions such as D and E, the small pinion E being here rotated through a splined bar F.

As for the transverse movements of carriage Y, they are achieved by means of a forward and backward movement cam G provided with a ramp H and which is designed to be actuated by a reciprocal translational movement. This movement is transmitted to the carriage by means of a slide I on which are mounted two rollers J one of which travels in ramp H of the cam and the other on the guide K of the carriage, advantageously provided adjustable so as to permit different conicities to be obtained or the parallelism of the work-piece to be adjusted.

The translational reciprocal movement of cam G is achieved in synchronism with the rotational movement of pitch cam A, by means of another cam N fixed on shaft C and controlling the movements of cam G through a mobile assembly formed essentially here by a lever L associated with a sliding part P returned by spring R.

In accordance with the invention, the forward and backward movement cam G is slidably mounted in a support Q in the form of a nut, transversely movable and which engages by a screw thread S with the output shaft T of a numerical control motor M, i.e. a motor whose step by step rotation is controlled numerically. Owing to this arrangement, a definite transverse movement of the forward and backward movement cam can be achieved and thus very easily the desired tool progression can be obtained, by suitably programming motor M. The movement towards the desired position is achieved during the return movement of the longitudinal carriage, therefore during a fairly long time, so that the power of said motor may be relatively low.

The thread-cutting machine of the invention thus presents at one and the same time the advantages of cam machines in so far as rapid work cycles are concerned and the advantages of numerically controlled machines in so far as the pitch progression is concerned which can be absolutely of any kind and which is here achieved by means of a low power motor, therefore not very costly.

It goes without saying moreover that the invention is not limited to the embodiment shown and described and that in particular other arrangements could be imagined permitting the transverse movement of the forward and backward movement cam to be achieved by means of a numerical control motor, this cam could moreover also be of another type than the one described.

What is claimed is:

1. A thread-cutting machine, of the type comprising a longitudinal carriage whose reciprocal movements are obtained from a first cam, called pitch cam, a transverse carriage carrying a tool and whose reciprocal movements are obtained from a second cam, called forward and backward movement cam, and means for ensuring the progression of the tool towards the work piece during successive threading cuts, characterized in that the tool progression means are formed by a numerical control motor capable of ensuring the transverse movement of the forward and backward movement cam and a third cam operatively connected between the pitch cam and forward and backward movement cam for synchronizing the reciprocal movement of the forward and backward movement cam with the pitch cam.

2. A thread-cutting machine according to claim 1, characterised in that the forward and backward movement cam is of the reciprocal translational movement type and comprises a ramp ensuring the reciprocal movement of the transverse carriage, said cam being slidably mounted in a support in the form of a nut provided movable in the transverse direction and engaging by a screw thread with the output shaft of the numerical control motor.

* * * * *